United States Patent [19]

Kuribayashi

[11] Patent Number: 4,660,071
[45] Date of Patent: Apr. 21, 1987

[54] CONVERSION OF LINE SEQUENTIAL TELEVISION COLOR SIGNAL TO SIMULTANEOUS SIGNALS BY ALTERNATING CARRIER PHASE INJECTION

[75] Inventor: Michio Kuribayashi, Kanagawa, Japan

[73] Assignee: Fuji Photo Film Co., Ltd., Kanagawa, Japan

[21] Appl. No.: 683,364

[22] Filed: Dec. 19, 1984

[30] Foreign Application Priority Data

Dec. 22, 1983 [JP] Japan .................. 58-241062
Dec. 22, 1983 [JP] Japan .................. 58-241063

[51] Int. Cl.⁴ .................. H04N 11/20; H04N 9/65
[52] U.S. Cl. .................. 358/11; 358/23
[58] Field of Search .................. 358/11, 14, 23

[56] References Cited

U.S. PATENT DOCUMENTS 3,845,498 10/1974 Justice .................. 358/11
4,012,772 3/1977 Chambers et al. .................. 358/11
4,095,254 6/1978 Romeas .................. 358/11

FOREIGN PATENT DOCUMENTS

46-1446 1/1971 Japan .................. 358/11

Primary Examiner—Michael A. Masinick
Assistant Examiner—Robert Michael Bauer

[57] ABSTRACT

A method for converting line sequential color signal to simultaneous signal is attained by selecting two color signals alternately every one horizontal scanning period. The color signals are applied to a balanced modulator. Two carriers with different phases are alternately switched every one horizontal scanning period and supplied to the balanced modulator to form carrier color signals with different phases every one horizontal scanning period. There are two carrier color signals of which one is a through carrier color signal and the other is produced by delaying the phase of the through carrier color signal by one horizontal scanning period then phase-shifting by 180 degrees. In an alternative embodiment, two balanced modulators are employed and a delayed replica of the color signals is applied to the second of the two modulators. Two carrier color signals are outputted from the two balanced modulators, and are mixed to produce simultaneous signal.

4 Claims, 19 Drawing Figures

CONVERSION OF LINE SEQUENTIAL TELEVISION COLOR SIGNAL TO SIMULTANEOUS SIGNALS BY ALTERNATING CARRIER PHASE INJECTION

BACKGROUND OF THE INVENTION

The present invention relates to a method for converting line sequential color signal to simultaneous signal, wherein line sequential carrier color signal is frequency-demodulated, followed by amplitude modulation and conversion to simultaneous signal, to obtain standard signal for NTSC system, providing a useful method for reproducing carrier image signal recorded on magnetic recording media.

France and other European countries use a standard television system called SECAM System. In SECAM system, two color difference signals R-Y and B-Y are selected by switching with a line sequentializing switch alternately every one horizontal scanning period (hereinafter called "1H period"), thus formed line sequential color difference signal is frequency-modulated with a color difference subcarrier and overlapped with luminance signal to obtain carrier image signal.

When reproducing the carrier image signal, after demodulation the signal is delayed by a 1H period, the delayed signal and undelayed signal are parallelly taken out to fill the removed portion of the color difference signal every 1H period to obtain two continuous color difference signals R-Y and B-Y. The process of taking out two color difference signals parallelly from line sequential color difference signal is referred to "simultaneization". The major components for the simultaneization are the 1H period delay circuit and the simultaneizing switch which alternately takes out the signal delayed by the 1H period delay circuit and undelayed signal.

Owing to its frequency modulation system, the SECAM system has a wide adaptability, especially when the time axis fluctuates as in the case of magnetic recording and reproduction system. In this case, because the line sequential color difference signal which is sequentialized at the recording side is frequency- modulated, the line sequential carrier color difference signal must be once demodulated then simultaneized, and the simultaneized color difference signal must be balance-modulated again in order to obtain standard signal for NTSC system at the reproducing side.

Figure 1:
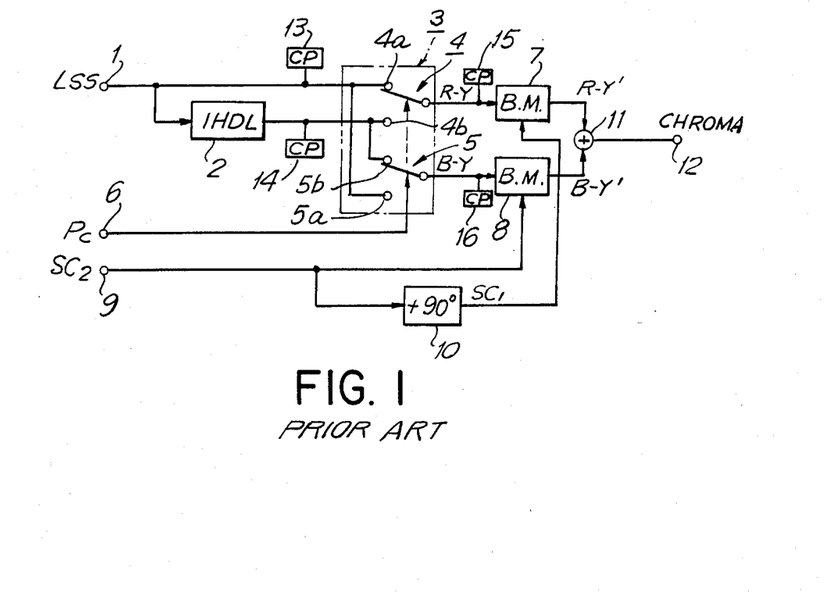
FIGS. 1 and 2 are a block diagram and its partial circuit diagram showing a device to materialize the simultaneizing method based on the conventional technology.

FIG. 1 is a block diagram showing schematically a device of a conventional technology in which standard simultaneous signal for NTSC system is obtained at the reproducing side of the magnetic recording and reproducing system based on SECAM system. As shown in the figure, a line sequential color difference signal LSS which is demodulated by a frequency demodulator and supplied through an input terminal 1 is applied to a simultaneizing switch 3 directly or through a 1H period delay circuit 2.

The simultaneizing switch 3 contains a switch 4 which outputs a color difference signal R-Y and a switch 5 which outputs another color difference signal B-Y. The switch 4 has contacts 4a and 4b, and the switch 5 has contacts 5a and 5b. The switches are switched at every 1H period by a control pulse Pc which is supplied through an input terminal 6 so that the contacts 4a and 5b, and 4b and 5a respectively, are selected simultaneously. The control pulse Pc can be easily generated by a horizontal drive signal (HD pulse).

Balanced modulators 7 and 8 balance-modulate subcarriers SC1 and SC2 which are different in phase by 90 degrees each other with the two simultaneized color difference signals R-Y and B-Y, respectively. Thus, the color difference signal R-Y balance-modulates the subcarrier SC1 which is produced by advancing 90 degrees the phase of the subcarrier SC2 supplied through an input terminal 9 by a phase shifter 10, and the color difference signal B-Y directly balance-modulates the subcarrier SC2, respectively.

A mixer 11 mixes two simultaneized carrier color difference signals R-Y' and B-Y' obtained in the balanced modulators 7 and 8 and transmits a carrier color difference signal CHROMA which is a color signal component of the NTSC standard signal through an output terminal 12.

13 and 14 indicate clamp circuits provided at the preceding stages of the simultaneizing switch 3, and 15 and 16 indicate clamp circuits provided at the following stages of the simultaneizing switch 3 (preceding stages of the balanced modulators 7 and 8), respectively.

The necessity of providing the clamp circuits 13 and 14 at the preceding stages of the simultaneizing switch 3, in addition to the clamp circuits 15 and 16 provided at the preceding stage of the balanced modulators 7 and 8, is described below.

In the simultaneizing system described above, the balanced modulators 7 and 8 are supplied with a through signal and a signal passed through a 1H period delay circuit 2 alternately every 1H period. However, since the delay circuit 2 substantially damps not only the transmission rate but also the signals, and since offset voltages of the analog switch 3 at contacts a and b are different each other, the balanced modulators are supplied with signals having different DC level at every 1H period. If there are no clamp circuits 13 and 14 at the preceding stages of the simultaneizing switch 3, time constants of the clamp circuits 15 and 16 must be increased sufficiently to clamp the average level of the signals. Therefore, if a change occurs in image pattern of the line sequential color difference signal LSS, its average level will also fluctuate and poor modulation in the balanced modulators 7 and 8 will result in.

In order to eliminate such a problem, the time constants of the clamp circuits 15 and 16 must be increased so that the blanking level of the color difference signal can be clamped and, at the same time, the clamp circuits 13 and 14 must be installed at the preceding stages of the simultaneizing switch 3, as shown in FIG. 1, resulting in complicated circuit configuration.

Figure 2:
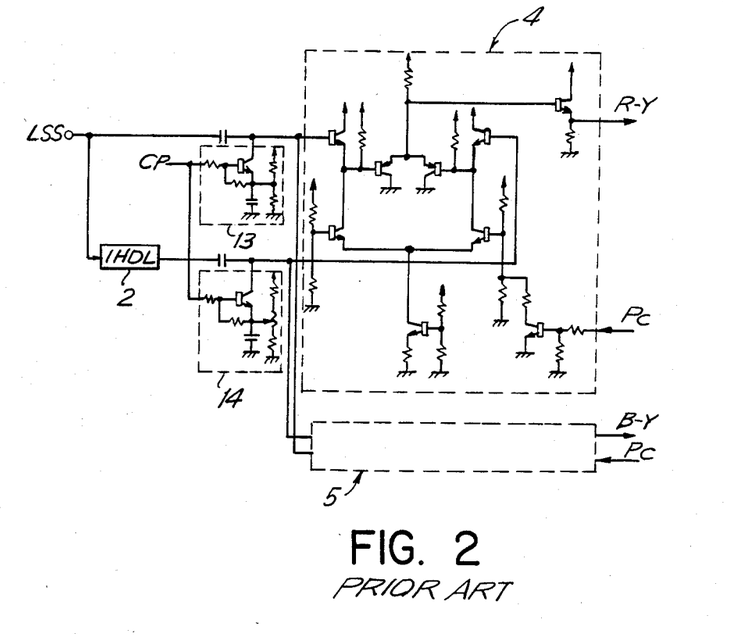

Another major defect is that the simultaneizing switch 3 must be an analog switch for switching the line sequential color difference signal LSS, and actual circuit is extremely complicated as shown in FIG. 2.

SUMMARY OF THE INVENTION

In view of the defects of the conventional technology described above, the present invention intends to provide a simultaneizing system for line sequential color signal with a simple circuit configuration.

In order to accomplish the above purpose of the present invention, the line sequential color signal formed by alternately selecting one of two color signals in every one horizontal scanning period is supplied to a balanced modulator, a line sequential carrier color signal having different phase for every horizontal scanning period are formed by supplying two carriers having different phases and switching alternately every one horizontal scanning period, to said balanced modulator, said line sequential carrier color signal is delayed by one horizontal scanning period, said delayed line sequential carrier color signal is phase-shifted by 180 degrees, and said phase-shifted line sequential carrier color signal is mixed with unshifted line sequential carrier color signal, and a line sequential color signal formed by selecting two color signals alternately every one horizontal scanning period is supplied to a balanced modulator, said balanced modulator is supplied with first and second carriers or third and fourth carriers having phases 90 degrees behind those of said first and second carriers, alternately stitched every one vertical scanning period and alternately switched every one horizontal scanning period, a line sequential carrier color signal is formed by said balanced modulator, said line sequential carrier color signal is delayed by one horizontal scanning period, said delayed line sequential carrier color signal is phase-shifted by 180 degrees, and said phase-shifted line sequential carrier color signal is mixed by first mixing means with unshifted line sequential carrier color signal, a carrier color signal from said first mixing means is mixed by second mixing means with a luminance signal, a frame signal is formed by alternately selecting field signals from said second mixing means whereof one is delayed by a half horizontal scanning period in a delay circuit and the other is undelayed by turning a switch every one vertical scanning period.

DETAILED DESCRIPTION OF THE PREFERRED EMBODIMENTS

Preferred embodiments of the present invention will now be described in detail referring to the drawings.

<First embodiment>

Figure 3:
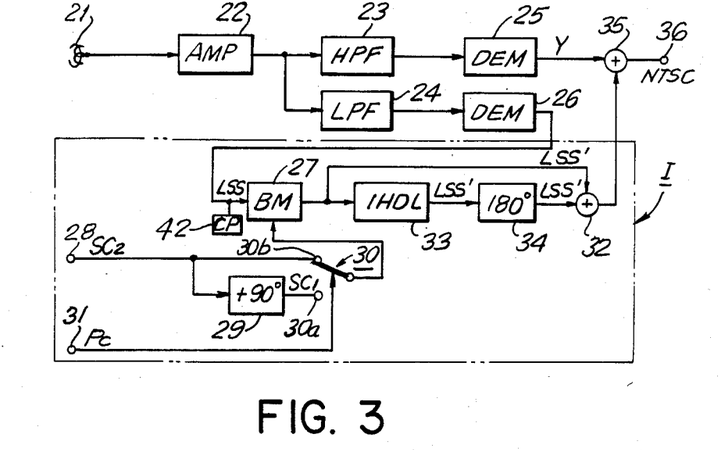
FIGS. 3 and 4 are a block diagram and its partial circuit diagram showing a device to accomplish the first embodiment according to the present invention, together with a reproducing device of the magnetic recording and reproducing system.

FIG. 3 is a block diagram showing the first embodiment of the present invention together with a reproducing device of a magnetic recording and reproducing system. As shown in the figure, a reproducing head 21 reproduces carrier video signal recorded on magnetic recording media. The line sequential color difference signal which is obtained by selecting two color difference signals alternately every 1H period and by frequency-modulating them and the carrier luminance signal obtained by frequency-modulating the color difference signal with luminance signal are frequency-multiplexed and recorded on magnetic recording media. The carrier video signal reproduced in a reproducing head 21 is supplied to a high-pass filter 23 and a low-pass filter 24 through a head amplifier 22. In the high-pass filter 23, the carrier luminance signal is extracted from the carrier video signal and is supplied to a frequency demodulator 25. A luminance signal Y is obtained as an output of this frequency demodulator 25. On the other hand, in the low-pass filter 24, the line sequential carrier color difference signal is extracted from the carrier video signal and is supplied to a frequency demodulator 26. As a result, a line sequential color difference signal LSS is obtained as an output signal of the frequency demodulator 26. A balanced modulator 27 which is supplied with the line sequential color difference signal LSS balance-modulates alternately either subcarrier SC1 or SC2 which are different in phase by 90 degrees each other with the line sequential color difference signal LSS. Thus, the balanced modulator 27 is supplied with the through subcarrier SC2 supplied through an input terminal 28 and the subcarrier SC1 which is phase-advanced by 90 degrees by a phase shifter 29, alternately selected every 1H period by a switch 30. At this time, the switch 30 is switched every 1H period by a control pulse Pc supplied through an input terminal 31 to alternately select a contact 30a which is supplied with the subcarrier SC1 and a contact 30b which is supplied with the subcarrier SC2. Thus, one of the color difference signals R-Y and B-Y comprising the line sequential color difference signal LSS, R-Y in this embodiment, always balance-modulates the subcarrier SC1, and the other color difference signal, B-Y in this embodiment, always balance-modulates the subcarrier SC2. A mixer 32 mixes a line sequential carrier color difference signal LSS' which is obtained in the balance modulator 27, delayed by 1H period with a 1H delay circuit 33, then phase-shifted by 180 degrees with a phase shifter 34, and a through signal. This simultaneizes the line sequential color difference signal LSS' to produce a carrier color difference signal CHROMA which is a color signal component of NTSC standard signal. A mixer 35 mixes a luminance signal Y which is an output signal of the frequency demodulator 25 and the carrier color difference signal CHROMA which is an output signal of the mixer 32. Thus, NTSC standard signal is obtained through an output terminal 36. In the figure, 42 is a clamp circuit. As obvious in the above description, the simultaneization system of the present invention can be composed of the balanced modulator 27, input terminals 28 and 31, mixer 32, 1H period delay circuit 33 and phase shifter 34. In FIG. 3, this portion is surrounded by two-dot dash lines and marked with a I.

Figure 4:
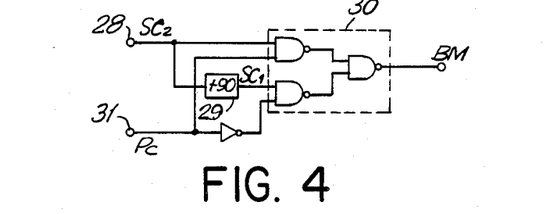

FIG. 4 shows a practical example of the switch 30 to switch the subcarriers SC1 and SC2. As obvious from the figure, the switch 30 can be composed of a gate circuit with a simple circuit configuration.

To obtain two simultaneized color difference signals R-Y' and B-Y' by a synchronized detection of the carrier color difference signal CHROMA formed by such a simultaneization system when reproducing the signal with an video reproducing monitor, subcarriers of a same type of carrier color difference signal must be respectively continuous. On the other hand, the relation between a frequency fc of subcarriers SC1 and SC2 and a horizontal scanning frequency fH in this type of magnetic recording and reproducing system is set so that the subcarriers SC1 and SC2 have a relation of frequency interleave, for example, fc=455/2×fH. (In general, fc=(n ½)fH, n=natural number)

Figure 5A:
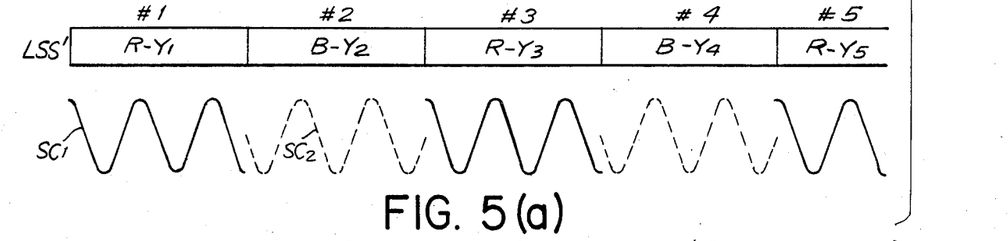
FIGS. 5(a) to 5(c) are schematics explaining conceptionally the phase relation between the subcarriers and the line sequential color difference signal in the balance modulator 27, the 1H period delay circuit 33 and the phase shifter 34.
Figure 5B:
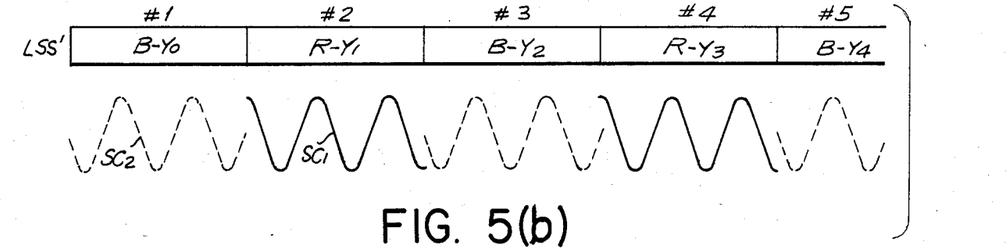
Figure 5C:
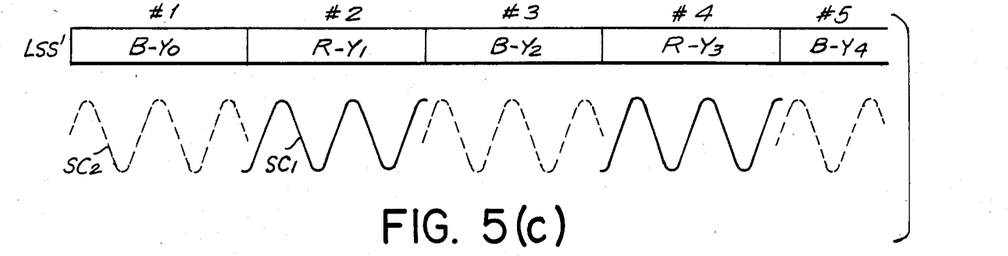

With this embodiment, the subcarriers SC1 and SC2 are continuous with good simultaneization even if the above condition fc=(n ½)fH is satisfied. This is described with reference to FIGS. 5(a), 5(b) and 5(c). FIG. 5(a) shows the relation between the through line sequential carrier color difference signal LSS' and the subcarriers SC1 and SC2, FIG. 5(b) shows the relation between the line sequential carrier color difference signal LSS' after delaying by a 1H period and the subcarriers SC1 and SC2, and FIG. 5(c) shows the relation between the line sequential color difference signal LSS' delayed by a 1H period and phase-shifted by 180 degrees and the subcarriers SC1 and SC2. In the figures, the subcarrier SC1 is indicated by a solid line and the subcarrier SC2 by a dotted line. A suffix to Y indicates a horizontal scanning line number to which the color difference signal belongs, and a single block corresponds to a single 1H period.

According to the figures, when the line sequential carrier color difference signal LSS' and a line sequential carrier color difference signal LSS' delayed by a 1H period are mixed, a #1 color difference signal R-Y1 is followed by a #2 color difference signal R-Y1, and a #1 color difference signal B-Y0 is followed by a #2 color difference signal B-Y2, respectively, and the subcarriers SC1 and SC2 continue accordingly and the same steps are repeated. Thus, the subcarriers SC1 and SC2 are continuous in the carrier color difference signal CHROMA which is an output signal of the mixer 32.

<Second embodiment>

Figure 6:
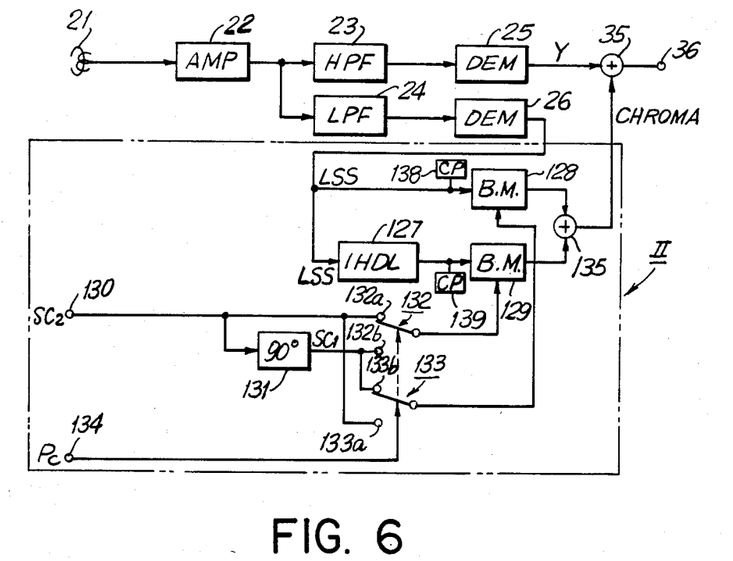
FIGS. 6 and 7 are a block diagram and a partial circuit diagram showing a device to accomplish the second embodiment of the present invention, together with a reproducing device of the magnetic recording and reproducing system.

FIG. 6 is a block diagram showing a device to accomplish the second embodiment according to the present invention, together with a reproducing device of the magnetic recording and reproducing system. As shown in the figure, a reproducing head 21 reproduces the carrier video signal recorded on magnetic recording media. The line sequential carrier color difference signal which is obtained by selecting two color difference signals alternately every 1H period and by frequency-modulating them and the carrier luminance signal obtained by frequency-modulating the luminance signal are frequency-multiplexed and recorded on magnetic media. The carrier video signal reproduced in the reproducing head 21 is supplied to a high-pass filter 23 and a low-pass filter 24 through a head amplifier 22. In the high-pass filter 23, the carrier luminance signal is extracted from the carrier video signal and is supplied to a frequency demodulator 25. A luminance signal Y is obtained as an output of this frequency demodulator 25. On the other hand, in the low-pass filter 24, the line sequential carrier color difference signal is extracted from the carrier video signal and is supplied to a frequency demodulator 26. As a result, line sequential color difference signals LSS are obtained as output signal of the frequency demodulator 26. One of the line sequential color difference signals LSS is supplied as it is, and the other is after being delayed by a 1H period in a 1H period delay circuit 127, to balanced modulators 128 and 129. The balanced modulator 128 balance-modulates either one of the subcarrier SC1 or SC2 which are different in phase by 90 degrees each other with the undelayed through line sequential color difference signal LSS, and the balanced modulator 129 balance modulates either one of the subcarriers SC1 or SC2 with the line sequential color difference signal delayed by 1H period. Thus the balanced modulators 128 and 129 are supplied with the through subcarrier SC2 supplied through an input terminal 130 and the subcarrier SC1 which is phase-advanced by 90 degrees with a phase shifter 131, alternately selected every 1H period by switches 132 and 133. The switch 132 has contacts 132a and 132b, and the switch 133 has contacts 133a and 133b, respectively. These switches are turned over every 1H period by a control pulse Pc supplied through an input terminal 134 so that the contacts 132a and 133b, or contacts 132b and 133a, are selected simultaneously. Thus, a color difference signal R-Y, which is one of color difference signals R-Y and B-Y comprising the through line sequential color difference signal LSS and the 1H-delayed line sequential color difference signal LSS, always balance-modulates the subcarrier SC1 in the balanced modulator 128 or balanced modulator 129, and the other color difference signal R-Y always balance-modulates the subcarrier SC2 in the balanced modulator 129 or the balanced modulator 128, respectively. A mixer 135 mixes one carrier color difference signal obtained in the balanced modulator 128 and the other carrier color difference signal obtained in the balanced modulator 129 and, since the other carrier color difference signal is obtained by delaying the phase of one carrier color difference signal by 1H period, color difference signals R-Y' and B-Y' are simultaneized by both color difference signals to produce a carrier color difference signal CHROMA which is a color signal component of the NTSC standard signal. A mixer 35 mixes the luminance signal which is an output signal of a frequency demodulator 25 and the carrier color difference signal CHROMA which is an output signal of the mixer 135. Thus, the NTSC standard signals are obtained from an output terminal 36. 138 and 139 are clamp circuits provided in the preceding stages of the balanced modulators 128 and 129. As obvious from the above description, the simultaneization system of this embodiment can be accomplished with a 1H period delay circuit 127, the two balance modulators 128 and 129, the input terminals 130 and 134, a phase shifter 131, switches 132 and 133 and the mixer 135. In FIG. 3, this portion is surrounded by two-dot dash lines and marked with a II.

Figure 7:
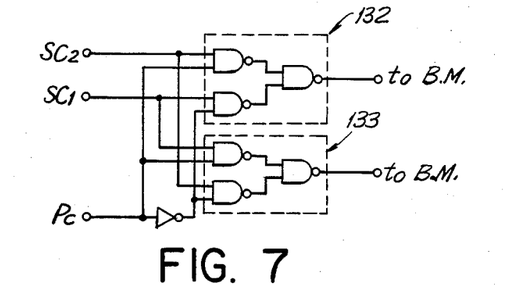

FIG. 7 shows a practical example of the switches 132 and 133 to switch the subcarriers SC1 and SC2. As obvious from the figure, these switches 132 and 133 can be composed of gate circuits, with a very simple circuit configuration as compared with the switch 4 shown in FIG. 2.

To obtain two simultaneized color difference signals R-Y' and B-Y' by a synchronized detection of the carrier color difference signal CHROMA formed by such a simultaneization system when reproducing the signal with a video reproducing monitor, subcarriers of a same type of carrier color difference signal must be continuous. On the other hand, the relation between a frequency fc of subcarriers SC1 and SC2 and a horizontal scanning frequency fH in this type of magnetic recording and reproducing system is set so that the subcarriers SC1 and SC2 have a relation of frequency interleave, for example, fc=455/2×fH. (In general, fc=(n=½)fH, n=natural number)

Figure 8A:
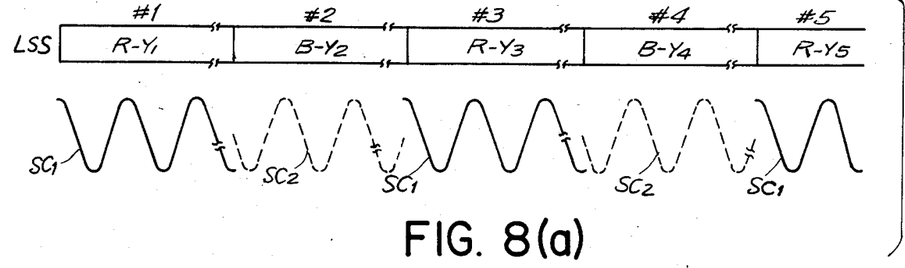
FIGS. 8(a) and 8(b) are schematics explaining conceptionally the phase relation between the subcarriers and the line sequential color difference signal in the balanced modulators 128 and 129.
Figure 8B:
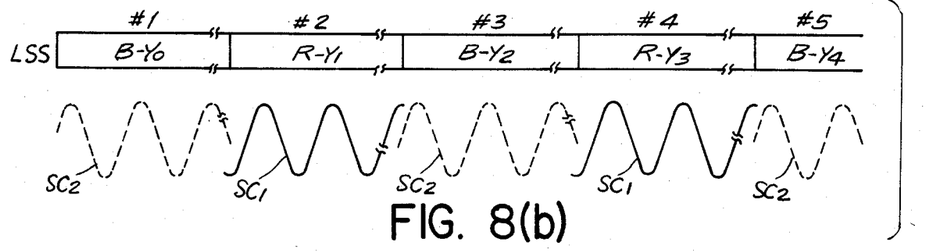

With this embodiment, the subcarriers SC1 and SC2 are continuous with good simultaneization even if the above condition fc=(n ½)fH is satisfied. This is described with reference to FIGS. 8(a) and 8(b). FIG. 8(a) shows the relation between the through line sequential carrier color difference signal LSS and the subcarriers SC1 and SC2, and FIG. 8(b) shows the relation between the line sequential carrier color difference signal LSS delayed by a 1H period and the subcarriers SC1 and SC2. In the figures, the subcarrier SC1 is indicated by a solid line and the subcarrier SC2 by a dotted line. A suffix to Y indicates a horizontal scanning line number to which the color difference signal belongs, and a single block corresponds to a single 1H period.

According to the figures, when the line sequential carrier color difference signal LSS and a line sequential carrier color difference signal LSS delayed by a 1H period are selected alternately every 1H, a #1 color difference signal R-Y1 is followed by a #2 color difference signal R-Y1, and a #1 color difference signal B-Y0 is followed by a #2 color difference signal B-Y2, respectively, and the subcarriers SC1 and SC2 continue accordingly and the same steps are repeated. Thus, the subcarriers SC1 and SC2 are continuous in the carrier color difference signal CHROMA which is an output signal of the mixer 135.

<Third embodiment>

When video signals are recorded on rotary magnetic recording media such as a magnetic disc, a so-called "field recording" method is sometimes used in which only odd number field or even number field of a single frame is recorded on a single track. To reproduce field carrier video signal which have been field-recorded to display them on an video monitoring device, the field carrier video signal must be converted to frame video signal matching NTSC standard signal, for example. This is referred to field/frame conversion system. In this case, if the color signal component of the video signal is recorded line-sequentially, they must be simultaneized at the reproducing side. The simultaneization system of the present invention can also be applied to this case.

Figure 9:
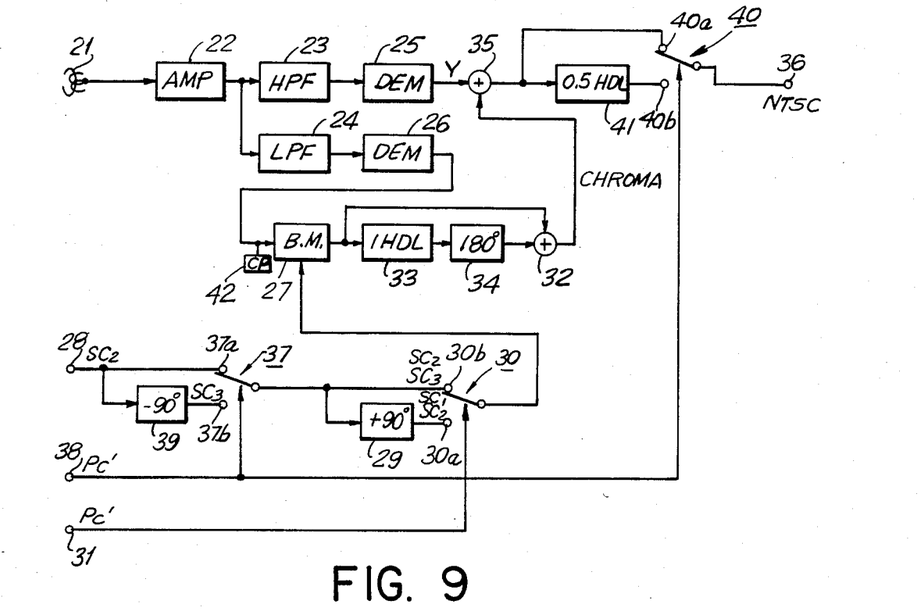
FIG. 9 is a block diagram showing the third embodiment applying the above first embodiment to a device to accomplish the field/frame conversion system.

However, the simultaneization and field/frame conversion of video signal , for example, to obtain NTSC standard signal, there is a new particular problem to be solved. FIG. 9 is a block diagram of the third embodiment in which the above problem is solved. Prior to the explanation of the figure, associated problems are described below.

With a reproducing device in which video signal of a same field is read repeatedly from the disc track, the field video signal is outputted continuously in time series. On the other hand, the NTSC system uses interlaced scanning. In order to form two fields comprising a single interlaced-scanned frame from video signal of a same field, the video signal of the even number field must be delayed by a half of 1H period relative to the odd number field. In detail, referring to FIG. 10, the horizontal scanning line of the odd number field is indicated by a solid line and that of the even number field by a dotted line. As can be seen from the figure, if one frame is composed of 525 horizontal scanning lines, the odd number field ends at the center of a 263rd scanning line #263H, or 262.5H, and thereafter the even number field comes. Therefore, in order to form a correct video as the even number field from the top of #264H, contents of the video signal of #264H must exactly correspond to those of the video signal of #1H. Since field video signal supplied by the magnetic disc return immediately from 262.5H to 0H, or the top of #1H, video signal of the even number field must be delayed by a period substantially equal to a half of 1H period relative to the odd number field for correct correspondence. Field carrier video signal reproduced from the magnetic disc is normally frequency-demodulated separately to the carrier luminance signal and line sequential carrier color difference signal. Therefore, the 0.5H period delay and field switching are required for both the luminance signal Y and the line sequential color difference signal LSS. This requires two delay circuits and two switching circuits, resulting in not only a complicated circuit configuration but also a substantial difficulty in adjustment for removing a flicker effect occurring in the reproduced video at a half of a vertical scanning frequency fv caused by a deviation in gain for the signal through a 0.5H delay circuit and the undelayed through signal.

In order to avoid such a difficulty in adjustment for removing the flicker, a delay circuit and a switching circuit can be inserted in the output side of the synthesized signals as NTSC standard signal. Thus, the simultaneized color difference signals R-Y and B-Y are formed from the line sequential color difference signal LSS to balance-modulate the subcarriers SC1 and SC2, and after combining with the luminance signal Y, can be passed through a 0.5H delay circuit and a switching circuit for switching the odd and even number fields.

However, with this circuit configuration, if the odd number field is of the through signal, the phase of the carrier color difference signal of the even number field is advanced 90 degrees, and the color signal will be out of pull in (color lock) at the top of even number field of each frame in an automatic phase control circuit of the video reproducing monitor. This will result in a false color in the upper part of the even number field of the reproduced video The false color appears more evidently on a hard copy, which is unpreferable in practical applications. Normally with a black-and-white monitor, the carrier color difference signal CHROMA is not removed from the luminance signal Y. However, if video signal with an out-of-phase carrier color difference signal CHROMA is reproduced on a black-and-white monitor, change in luminance due to the carrier color difference signal CHROMA will not be compensated at every frame and spots having a brightness corresponding to the waveform of the carrier color difference CHROMA will appear in the reproduced video.

This embodiment is designed to solve all the above described problems in the field/frame conversion system.

The embodiment will be described in detail below referring to the drawings.

FIG. 9 is a block diagram showing the third embodiment to accomplish the field/frame conversion system to which the simultaneization system according to the first embodiment of the present invention is applied. In the figure, a same number is used for a same component in FIG. 3 and a same description will be omitted.

As shown in FIG. 9, a switch 37 has contacts 37a and 37b which are alternately selected. The contact 37a is directly supplied with the subcarrier SC2 through the input terminal 28, and the contact 37b is supplied with a subcarrier SC3 which is produced by delaying 90 degrees the subcarrier SC2 supplied through the input terminal 28 by the phase shifter 29. The switch 37 is switched by a control pulse Pc' having a frequency equal to a half of the vertical synchronizing frequency fv which is supplied through an input terminal 38. Thus, the subcarrier SC2 or the subcarrier SC3 is selected every one vertical scanning period (hereinafter called 1V period), and the subcarrier SC2 is selected in the odd number field and the subcarrier SC3 in the even number field, respectively. As a result, the contact 30b of the switch 30 is supplied with the subcarrier SC2 or SC3 alternately every 1V period, and the contact 30a of the switch 30 is supplied with the subcarrier SC1 or SC2, which is produced by advancing the phase of the subcarrier SC2 or SC3 by 90 degrees with the phase shifter 29. Thus, the subcarriers in this embodiment of the present invention include the subcarrier SC2, the subcarrier SC1 which is produced by advancing the phase of the subcarrier SC2 by 90 degrees, and the subcarrier SC3 which is produced by delaying the phase of the subcarrier SC2 by 90 degrees. In the odd number field, the subcarrier SC1 is balance-modulated with the color difference signal R-Y of the line sequential color difference signal LSS, and the subcarrier SC2 is balance-modulated with the color difference signal B-Y of the line sequential color difference signal LSS, respectively. In the even number field, the subcarrier SC2 is balance-modulated with the color difference signal R-Y of the line sequential color difference signal LSS, and the subcarrier SC3 is balance-modulated with the color difference signal B-Y of the line sequential color difference signal LSS, respectively. Thus, the subcarriers (SC1 and SC2, SC2 and SC3) different in phase by 90 degrees alternately every field are modulated in right angle 2-phase. A mixer 32 synthesizes the line sequential carrier color difference signal LSS' which is an output signal of the balanced modulator 27 and a signal which is produced by delaying the phase of the line sequential color difference signal LSS' by a 1H period then shifting its phase by 180 degrees to accomplish simultaneization, and transmits two carrier color difference signals CHROMAo and CHROMAe, of which the phase of the right angle 2-phase modulated subcarriers (SC1 and SC2, SC2 and SC3) is different in phase in between the odd number field and even number field, to a mixer 35 alternately every field. At this time, the subcarriers of a same type of carrier color difference signals must be continuous in each field. It is evident from the description referring to FIG. 3 that this condition is satisfied.

The mixer 35 synthesizes the carrier color difference signals CHROMAo and CHROMAe with the luminance signal Y which is an output signal of the frequency-demodulator 25. This synthesized signal is supplied to an output terminal 36 of this device through a contact 40a of a switch 40 and, at the same time, through a 0.5H period delay circuit 41 and another contact 40b of the switch 40. The switch 40 is switched by the control pulse Pc' as in the case of the switch 37 to select the contact 40a or 40b alternately every 1V period. Thus, a through synthesized signal appears in the odd number field, and a synthesized signal delayed by 0.5H period appears in the even number field, respectively. As a result, the 0.5H period delay switching described above between the odd number field and even number field is performed in the conversion process from the field video signal to the frame video signal. Consequently, as will be described later in detail, by this switching and 0.5H period delaying, the signal synthesized from the luminance signal Y and the carrier color difference signals CHROMAo and CHROMAe in the mixer 35 is outputted from the output terminal 36, for example, to an video monitor as a correct frame video signal of NTSC format for the standard color television system.

Figure 10:
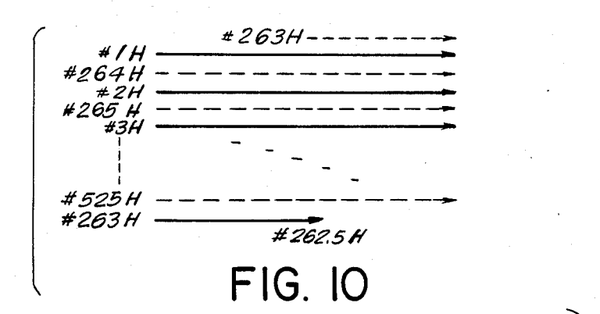
FIG. 10 is a schematic showing interlaced scanning in the NTSC system used for explaining the principle of the example.

More specifically, as shown in FIG. 10, the last scanning line #263H of the odd number field terminates at its center position, and the latter half starts from the center of the first scanning line of the even number field. The switch 40 is turned to the contact 40b which selects the signal delayed by the delay circuit 41 and the video signal of the even number field is obtained from the output of the delay circuit 41. Since this signal is delayed by 0.5H period from that of the odd number field, the latter half of the scanning line #263H contains the same information as of the former half, however, this portion is normally blacked out. The point of time when the field video signal supplied externally from a magnetic disc (not shown) returns to the beginning of the first scanning line of the field corresponds to the top of #264H of the even number field in the video output signal of the output terminal 36.

Therefore, #264H of the even number field contains the same information as of #1H of the odd number field, and the scanning lines thereafter also contain the same information in both fields. This configures a frame of interlaced scanning. When the field video signal returns again from the even number field to the odd number field, during the vertical blanking period, the last scanning line #525H finishes scanning and, at the same time, the switch 40 is turned to the contact 40a which selects the through signal of the mixer 35, and the synthesized signal which is not delayed by 0.5H period is outputted to the output terminal 36.

As described above, the switch 37 is alternately supplied with the subcarrier SC3 which is 90-degree phase-shifted every field by the phase shifter 39 or the through subcarrier SC2. This means as follows.

In the NTSC system, as well known, a subcarrier frequency fsc, a horizontal scanning frequency fH and a vertical scanning frequency fv have the following relation.

$2fsc/455 = fH$ $2fH/525 = fv$

Figure 11:
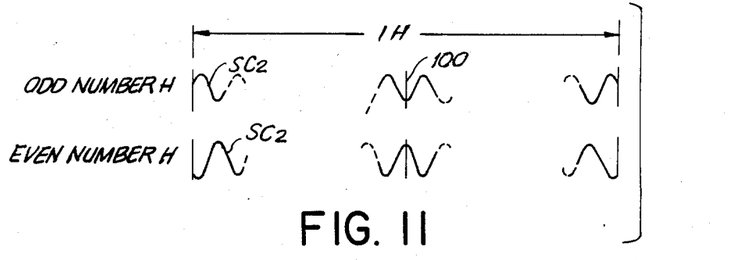
FIGS. 11 through 15 show waveforms of the color subcarriers and carrier color difference signals used in the explanation of the operation principle of the example shown in FIG. 9.
Figure 12:
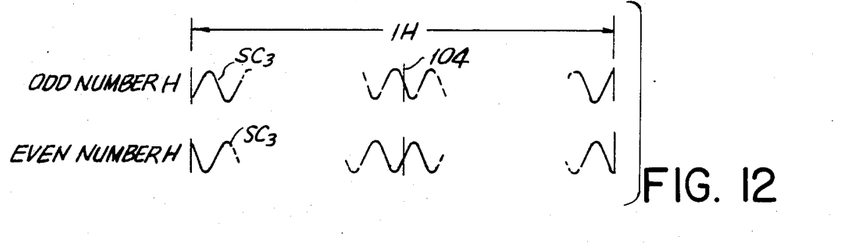

As can be seen from the above equations, the phase of the subcarrier applied to the input terminal 28 is inverted by 180 degrees every 1H period, as shown in FIG. 11. This is the original signal of the subcarriers SC1 and SC2 which are used in the odd number field. The subcarrier SC3 outputted from the phase shifter 39 is phase-shifted by $-90$ degrees in the phase shifter 39 and has a waveform as shown in FIG. 12. This is the original signal of the subcarriers SC2 and SC3 which are used in the even number field.

Figure 13:
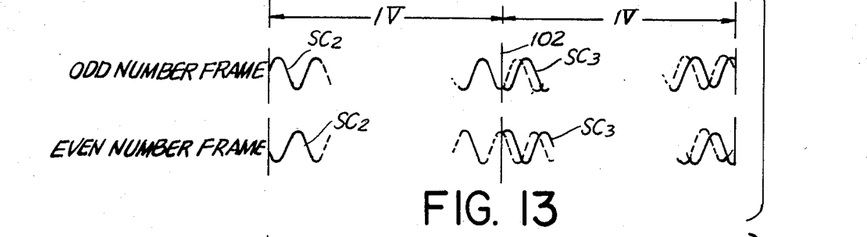

These steps are repeated every frame. Since one frame contains an odd number (525) of scanning lines and the phase of the subcarriers is inverted by 180 degrees every 1H period, the phase condition of the subcarriers (SC1 and SC2, SC2 and SC3) used in the balanced modulator 27 cycles every two frames, as shown in FIG. 13. In FIG. 13, the dot dash line indicates the waveform for the case if the switch 37 does not perform switching and the subcarrier SC2 at the input terminal 37a is supplied to the balanced modulator 27 and the phase shifter 29 in either field.

Figure 14:
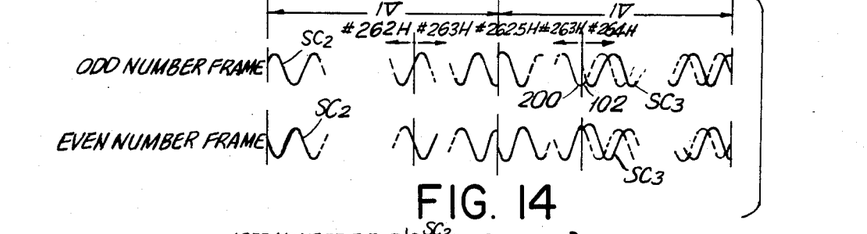
Figure 15:
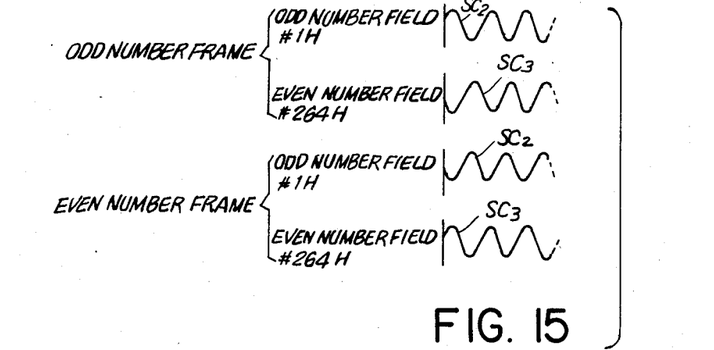

In this case, one carrier color difference signal, B-Y for example, contained in the scanning line #1H in the odd number frame is formed by the subcarrier at the phase condition shown at the upper left of FIG. 14. FIG. 14 shows the phase condition of the top of the scanning line of the subcarrier SC2 of the color difference signal B-Y which is the original signal of the carrier color difference signal CHROMAo in the synthesized signals. When the color difference signal moves from the odd number field to the even number field, the switch 37 turns to the contact 37b which selects the output signal of the phase shifter 39, and the phase of the subcarrier SC3 supplied to the balanced modulator 27 is delayed by 90 degrees, of which the phase condition in the 1H period is as shown in FIG. 12. At the same time, the switch 40 also turns to the delay circuit 41, and the first scanning line in the even number field in the NTSC standard signal outputted from the output terminal 36 is the same as of the first half of the last scanning line #263H of the odd field. Thus, the waveform of the carrier color signal of the synthesized signal at the end of the scanning line #263H of the even number field terminates with the phase indicated at a center point 100 of an odd number scanning line in FIG. 11 (or point 200 in FIG. 12). This is actually blacked out in the output signal of the output terminal 36.

However, from the top of #264H of the even number field, a signal balance-modulated with the subcarrier SC3 which is phase-shifted by −90 degrees by the phase shifter 39 is outputted from the delay circuit 41. Then, the synthesized signal containing the subcarrier SC3 with the phase shown at a beginning point 102 of the even number field, i.e. the right half field of the odd number field in FIGS. 13 and 14, is outputted from the delay circuit 41 to the output terminal 36 through the switch 40. As obvious from FIG. 14, the carrier color difference signal CHROMAe of #264H has the reverse phase to #1H of that frame, the odd number frame in this case.

Similarly, when the signal moves from the even number field of the odd number frame to the subsequent odd number field of the even number frame, the switch 37 is connected to the contact 38a in the vertical scanning period. Thus, the phase of the subcarrier SC2 supplied to the balanced modulator 27 and the phase shifter 29 is advanced by 90 degrees, as shown in FIG. 11. At the same time, the switch 40 is also connected to the contact 40a, and the first scanning line of the odd number field in the signal outputted from the output terminal 36 is the same as of the undelayed signal of #1H.

In this case, the subcarrier SC3 at the end of #525H of the immediately preceding even number field terminates with the phase shown as a midpoint 104 in FIG. 12 which works as the end point due to a 0.5H delay of the odd number scanning line, and thereafter the continuous carrier color difference signal CHROMAo continues from #1H of the odd number field of the even number frame, the carrier color signal having a phase shown in the lower left half of FIGS. 13 and 14. This signal is combined with the luminance signal Y and directly transmitted to the output terminal 36.

After the top of #264H of the next even number field in this even number frame, a signal derived by balance-modulating the subcarrier SC3 which is phase-shifted by −90 degrees in the phase shifter 39 is inputted to the mixer 35, which is then outputted from the output terminal 36 through the delay circuit 41. Thus, the carrier color difference signal CHROMAe shown at the even number frame #264H in FIGS. 13 and 14 is outputted.

The signals thus outputted from the output terminal 36 are in a relation of frequency interleave each other as indicated by the phase of the original signal for the carrier color difference signals CHROMAo and CHROMAe, for example the subcarrier SC2, in the first scanning line of each field as shown in FIG. 13, forming the NTSC signals. Therefore, fluctuation in luminance according to the carrier color difference signals contained in the composite video signal will be set off each other between frames, eliminating occurrence of bright spots in the reproduced video. Also, no pull in defect due to phase shift of the carrier color difference signal will be caused in the video monitor connected to the output terminal 36.

In order to describe such an effect, suppose that the phase shifter 39 and the switch 37 are not installed and the subcarrier SC2 is directly supplied from the input terminal 28 to the balanced modulator 27 and the phase shifter 29. Since there is no 90-degree phase shift of the carrier color difference signal CHROMA between fields, the phase of the carrier color difference signal CHROMA will be as shown by the dot dash lines in FIGS. 13 and 14. Therefore, in the signal outputted from the output terminal 36, the phase of the carrier color difference signal CHROMAe in the even number fields will be shifted by 90 degrees relative to that of this device, and the monitoring device will be out of color synchronization at the beginning of these fields. As described above, the device of this embodiment has no such defects because the phase of the color subcarriers is controlled.

The device of this embodiment does not require two 0.5H period delay circuits to convert the field video signal to the frame video signal, providing simplified circuit configuration. Moreover, a single switch is enough for switching individual fields, with easy adjustment for removing flicker from the reproduced video.

In addition, as the phase of the color subcarriers is controlled synchronizing with each field, fluctuation in luminance of the reproduced video according to the carrier color signals contained in the composite video signal can be sufficiently set off, eliminating occurrence of bright spots in the reproduced video. Also, no pull in defect due to phase shift of the carrier color difference signal will be caused in the video monitor connected to the output terminal of the device.

While this embodiment has described the simultaneization of signals to produce the NTSC standard signal, this method can be applied to all cases in which the line sequential color signal is balance-modulated and simultaneized at a time, such as for producing standard signal for PAL system.

<Fourth embodiment>

This embodiment is designed, as with the third embodiment, to solve all the above described problems in the field/frame conversion system, in which the simultaneization system according to the second embodiment is applied to the field/frame conversion system shown in the third embodiment.

Figure 16:
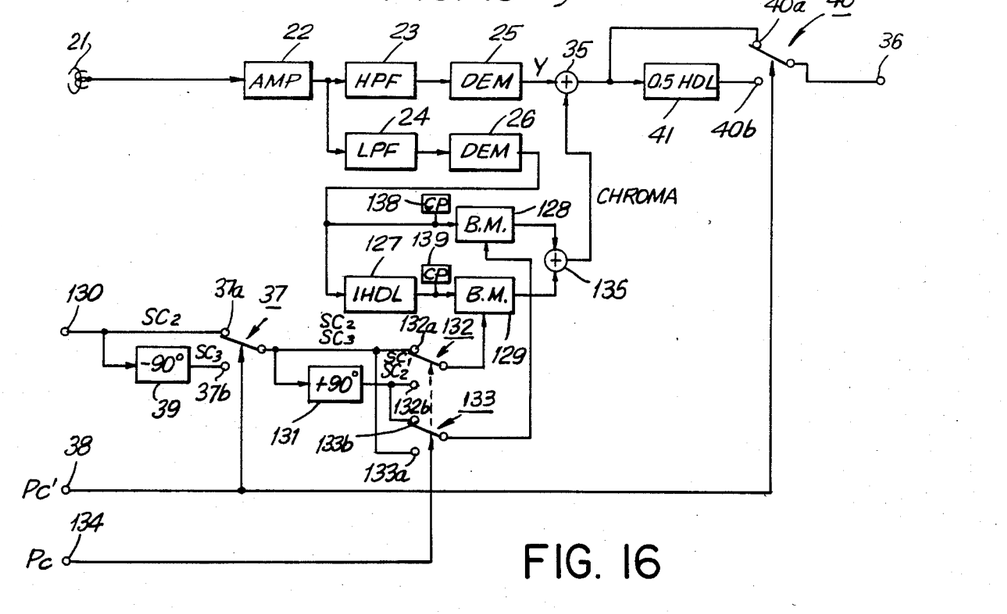
FIG. 16 is a block diagram of the fourth embodiment to accomplish the field/frame conversion system to which the above second embodiment is applied.

FIG. 16 is a block diagram showing the fourth embodiment.

In the figure, a same number is used for a same component in FIG. 6 and a same description will be omitted.

As shown in FIG. 16, a switch 37 has contacts 37a and 37b which are alternately selected. The contact 37a is directly supplied with the subcarrier SC2 through the input terminal 130, and the contact 37b is supplied with a subcarrier SC3 which is produced by delaying 90 degrees the subcarrier SC2 supplied through the input terminal 130 by a phase shifter 39. In this case, the switch 39 is switched by a control pulse Pc' having a frequency equal to a half of the vertical synchronizing frequency fv which is supplied through an input terminal 38. Thus, the subcarrier SC2 or the subcarrier SC3 is selected every one vertical scanning period (hereinafter called 1V period), and the subcarrier SC2 is selected in the odd number field and the subcarrier SC3 is selected in the even number field, respectively. As a result, the contact 132a of the switch 133 and the contact 133a of the switch 133 are supplied with the subcarriers SC2 and SC3 alternately every 1V period, and the contact 132b of the switch 132 and the contact 133b of the switch 133 are supplied with the subcarriers SC1 and SC2 which are produced by advancing the phase of the subcarriers SC2 and SC3 by 90 degrees with the phase shifter 131, alternately every 1V period. Thus, this embodiment uses three subcarriers, the subcarrier SC2, the subcarrier SC1 which is produced by advancing the phase of the subcarrier SC2 by 90 degrees, and the subcarrier SC3 which is produced by delaying the phase of the subcarrier SC2 by 90 degrees. In the odd number field, the subcarrier SC1 is balance-modulated with the color difference signal R-Y of the line sequential color difference signal LSS, and the subcarrier SC2 is balance-modulated with the color difference signal B-Y of the line sequential color difference signal LSS, respectively. In the even number field, the subcarrier SC2 is balance-modulated with the color difference signal R-Y of the line sequential color difference signal LSS, and the subcarrier SC3 is balance-modulated with the color difference signal B-Y of the line sequential color difference signal LSS, respectively. Thus, the subcarriers (SC1 and SC2, SC2 and SC3) different in phase by 90 degrees alternately every field are modulated in right angle 2-phase. The mixer 135 synthesizes the line sequential color difference signals which are output signals of the balanced modulators 128 and 129 to accomplish simultaneization, and transmits two carrier color difference signals CHROMAo and CHROMAe, of which the phase of the subcarriers (SC1 and SC2, SC2 and SC3) modulated in right angle 2-phase is different in phase in between the odd number field and even number field, to the mixer 35. At this time, the subcarriers of a same type of carrier color difference signals must be continuous in each field. It is evident from the above description referring to FIG. 8 that this condition is satisfied.

The mixer 35 synthesizes the carrier color difference signals CHROMAo and CHROMAe with the luminance signal Y which is an output signal of the frequency demodulator 25. This synthesized signal is supplied to the output terminal 36 of this device alternately through a contact 40a of the switch 40 and through a 0.5H period delay circuit 41 and another contact 40b of the switch 40. The switch 40 is switched by the control pulse Pc' as in the case of the switch 37 to select the contact 40a or 40b alternately every 1V period. Thus, a through synthesized signal appears in the odd number field, and a synthesized signal delayed by 0.5H appears in the even number field, respectively. As a result, the 0.5H period delay switching described above between the odd number field and even number field is performed in the conversion process from the field video signal to the frame video signal. Consequently, as well be described later in detail, by this switching and 0.5H period delaying, the signal synthesized from the luminance signal Y and the carrier color difference signals CHROMAo and CHROMAe in the mixer 35 is outputted from the output terminal 36, for example, to an video monitor as a correct frame video signal of NTSC format for the standard color television system.

More specifically, as shown in FIG. 10, the last scanning line #263H of the odd number field terminates at its center position, and the latter half starts from the center of the first scanning line of the even number field. The switch 40 is turned to the contact 40b which selects the signal delayed by the delay circuit 41 and the video signal of the even number field is obtained from the output of the delay circuit 41. Since this signal is delayed by 0.5H period from that of the odd number field, the latter half of the scanning line #263H contains the same information as of the former half, however, this portion is normally blacked out. The point of time when the field video signal supplied externally from a magnetic disc (not shown) returns to the beginning of the first scanning line of the field corresponds to the top of #264H of the even number field in the video output signal of the output terminal 36.

Therefore, #264H of the even number field contains the same information as of #1H of the odd number field, and the scanning lines thereafter also contain the same information in both fields. This configures a frame of interlaced scanning. When the field video signal returns again from the even number field to the odd number field, during the vertical blanking period, the last scanning line #525H finishes scanning and, at the same time, the switch 40 is turned to the contact 40a which selects the through signal of the mixer 35, and the synthesized signal which is not delayed by 0.5H period is outputted to the output terminal 36.

As described above, the switch 37 is alternately supplied with the subcarrier SC3 which is 90-degree phase-shifted every field by the phase shifter 39 or the through subcarrier SC2. The reason of this is same as in the case of the third embodiment. If the phase shifter 39 and the switch 37 are not installed and the subcarrier SC2 is directly supplied from the input terminal 130 to the balanced modulators 128 and 129 and the phase shifter 131, there is no 90-degree phase shift of carrier color difference signal CHROMA between fields, and the phase of the carrier color difference signal CHROMA will be as shown by the dot dash lines in FIGS. 13 and 14. Therefore, in the signals outputted from the output terminal 36, the phase of the carrier color difference signal CHROMAe in the even number fields will be shifted by 90 degrees relative to that of this device, and the monitoring device will be out of color synchronization at the beginning of these fields. As described above, the device of this embodiment has no such defects because the phase of the color subcarriers is controlled.

The device of this embodiment does not require two 0.5H period delay circuits to convert the field video signals to the frame video signals, providing simplified circuit configuration. Moreover, a single switch is enough for switching individual fields, with easy adjustment for removing flicker from the reproduced image.

In addition, as the phase of the color subcarriers are controlled synchronizing with each field, as in the case of the third embodiment, fluctuation in luminance of the reproduced video according to the carrier color signals contained in the composite video signal can be sufficiently set off, eliminating occurrence of bright spots in the reproduced image. Also, no pull in defect due to phase shift of the carrier color difference signal will be caused in the video monitor connected to the output terminal of the device.

While this embodiment has described the simultaneization of signals to produce the NTSC standard signal., similarly to the third embodiment, this method can be applied to all cases in which the line sequential color signal is balance-modulated and simultaneized at a time, such as for producing standard signals for PAL system.

In the above described embodiment, if the line sequential color signal LSS is recorded so that the value of the base band is slightly different, a circuit to add pulses to compensate the difference every 1H period can be inserted, for example, into the stage following the frequency modulator 26 in FIG. 3.

In the first and third embodiments of the present invention, as described above, since a carrier color signal is obtained by balance-modulating carrier waves having different phases with either color signal of same color forming the line sequential color signal, and a carrier color signal which is delayed by 1H period and an undelayed signal are mixed, both color signals can be simultaneized as carrier color signal. This eliminates the need of simultaneizing switch and associated clamp circuits, and a single balanced modulator is enough for the purpose. The carrier color signal can be delayed then phase-shifted by 180 degrees prior to the simultaneization to obtain carrier signal for NTSC system. Since the carrier wave is a single AC signal, the above carrier waves can be selected alternately by a digital switching circuit with a simple circuit configuration.

Since, in the second and fourth embodiments according to the present invention, the through line sequential color signal and its 1H-period delayed signal are separately balance-modulated, then both signals are mixed, and the phase of the carriers supplied to the balance modulators is alternately changed every 1H period, the line sequential color signals R-Y and B-Y are modulated respectively with subcarriers of different phases and simultaneized, providing the NTSC standard signals with continuous subcarriers of individual carrier color signals. Each one clamp circuit can be inserted in the preceding stage of each balanced modulator. The switching circuit is only for switching the subcarriers and can be composed of a digital switching circuit with a very simple circuit configuration.

I claim:

1. A method for converting a line sequential television color signal to a simultaneous signal, in a field signal to frame signal conversion comprising the steps of:
    selecting one of two color signals altrenately every one horizontal scanning period;
    applying the selected color signal to a balanced modulator;
    providing a first carrier and a second carrier shifted in phase from said first carrier by ninety degrees;
    supplying one of said first carrier and said second carrier in alternating fashion to said modulator in synchronism with the alternating selection of the color signal said step of supplying one of said carriers including a step of selecting one of said first carrier and said second carrier alternately every one vertical scanning period, and every one horizontal scanning period resulting in an output signal being outputted by said modulator;
    delaying said modulator output signal by one horizontal scanning period to provide a delayed signal;
    introducing a phase shift of 180 degrees between said delayed signal and said modulator output signal;
    subsequent to said phase shifting, mixing said delayed signal with said modulator output signal in a first mixer to produce an output carrier of said first mixer;
    mixing a luminance signal with said first mixer output carrier in a second mixer to produce a combined signal;
    delaying said combined signal of said second mixer by a half horizontal scanning period to provide a delayed combined signal; and
    switching alternately between said elayed combined signal and said combined signal every one vertical scanning period to extract field signals from said combined signal of said second mixer.

2. A method according to claim 1 wherein, in said carrier supplying step, said step of switching is accomplished by a circuit comprising:
    a first gate having a first input terminal and a second input terminal, there being an inverter coupled to said second input terminal of said second gate; and
    a third gate having a first input terminal coupled to an output terminal of said first gate and a second input terminal coupled to an output terminal of said second gate; and wherein said selecting step of said supplying step comprises:
    applying said first carrier to said first input terminal of said first gate;
    applying a pulse signal to said second input terminal of said first gate and to said inverter repetitively every one horizontal scanning period; and
    applying said second carrier to said first input terminal of said second gate, to output from said third gate alternately said first carrier and said second carrier.

3. A method for converting a line television sequential color signal to simultaneous signal, in a field signal to frame signal conversion comprising the steps of:
    selecting oen of two color signals alternately every one horizontal scanning period;
    delaying the selected color signal by one horizontal scanning period to provide delayed and undelayed color signals;
    applying the undelayed color signal to a first balanced modulator;
    applying the delayed color signals to a second balanced modulator;
    providing a first carrier and a second carrier shifted in phase from said first carrier by ninety degrees;
    first supplying said first carrier and said second carrier in alternating fashion to said first modulator in synchronism with the alternating selection of the two color signals, said first step of supplying carriers including a step of selecting one of said first carrier and said second carrier alternately every one vertical scanning period and every one horizontal scanning period resulting in an output signal being outputted by said first modulator;

secondly supplying said first carrier and said second carrier in alternating fashion to said second modulator in synchronism with the alternating selection of the two color signals, said second step of supplying carriers including a step of selecting one of said first carrier and said second carrier alternately every one vertical scanning period and every one horizontal scanning period resulting in an output signal being outputted by said second modulator, the phases of the output signals of said first and said second modulators differing every one horizontal scanning period;

mixing said first modulator output signal with said second modulator output signal in a first mixer to produce an output carrier of said first mixer;

mixing a luminance signal with said first mixer output carrier in a second mixer to produce a combined signal;

delaying said combined signal of said second mixer by a half horizontal scanning period to provide a delayed combined signal; and switching alternately between said delayed combined signal and said combined signal every one vertical period to extract field signals froms aid combined signal of said second mixer.

4. A method according to claim 3 wherein in each said first and said second steps of supplying carriers, said step of selecting is accomplished by a circuit comprising:

a first gate having a first input terminal and a second input terminal;

a second gate having a first input terminal and a second input terminal, there being an inverter coupled to said second input terminal of said second gate; and a third gate having a first input terminal coupled to an output terminal of said first gate and a second input terminal coupled to an output terminal to said second gate; and wherein said switching step of said supplying step comprises:

applying said first carrier to said first input terminal of said first gate;

applying a pulse signal to said second input terminal of said first gate and to said inverter repetitively every one horizontal scanning period; and applying said second carrier to said first input terminal of said second gate, to output from said third gate alternately said first carrier and said second carrier.

* * * * *